E. H. TAYLOR.
MACHINE FOR MAKING INSOLES.
APPLICATION FILED APR. 24, 1916.

1,337,290.

Patented Apr. 20, 1920.
5 SHEETS—SHEET 1.

INVENTOR:
Eugene H. Taylor
by Macleod, Calver, Copeland & Dike
Attys.

E. H. TAYLOR.
MACHINE FOR MAKING INSOLES.
APPLICATION FILED APR. 24, 1916.

1,337,290.

Patented Apr. 20, 1920.
5 SHEETS—SHEET 2.

E. H. TAYLOR.
MACHINE FOR MAKING INSOLES.
APPLICATION FILED APR. 24, 1916.

1,337,290.

Patented Apr. 20, 1920.
5 SHEETS—SHEET 5.

INVENTOR
Eugene H. Taylor
by Macleod, Calver, Copeland & Dike
Attys.

UNITED STATES PATENT OFFICE.

EUGENE H. TAYLOR, OF HYDE PARK, MASSACHUSETTS; GEORGE A. TAYLOR ADMINISTRATOR OF SAID EUGENE H. TAYLOR, DECEASED.

MACHINE FOR MAKING INSOLES.

1,337,290.   Specification of Letters Patent.   Patented Apr. 20, 1920.

Application filed April 24, 1916. Serial No. 93,105.

*To all whom it may concern:*

Be it known that I, EUGENE H. TAYLOR, a citizen of the United States, residing at Hyde Park, county of Suffolk, State of Massachusetts, have invented a certain new and useful Improvement in Machines for Making Insoles, of which the following is a specification, reference being had therein to the accompanying drawings.

My invention has for its object a new and improved machine for forming insoles which comprise two members each formed from a blank of leather or similar material, the inner being provided with a lip at substantially right angles to the plane of the insole, and the outer being folded back upon itself to form an edge of double thickness and then bent upwardly adjacent to the edge of the inner member. An insole of this general type is shown in U. S. Letters Patent No. 1,062,536 dated May 20, 1913. The machine embodying my present invention resembles in some respects that shown in my prior Patent No. 1,152,131 dated August 31, 1915, but the present machine is adapted to be driven by power and to be operated at much increased speed by reason of the important differences in its construction and mode of operation which will be explained.

The machine shown in the drawings forming part hereof is adapted for the manufacture of either the outer or inner members of which the insole is composed, it being only necessary to make slight adjustments to adapt it to the manufacture of either of the members or to use it to assemble the said members and to produce a finished insole. In practice, it is preferable to employ a separate machine for each operation. For convenience of illustration, the machine is shown in most of the figures of the drawings accompanying this specification as adjusted for the manufacture of the outer member, because this illustrates most clearly the construction and principles of operation of the machine.

Figure 1:
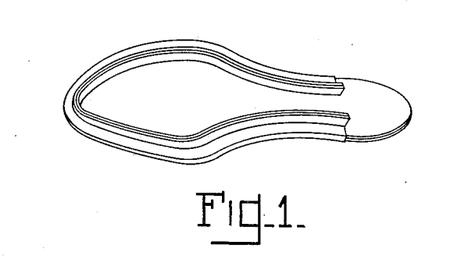
Figure 1 is a view in perspective of a completed insole of the kind adapted to be constructed by the herein described machine.
Figure 3:
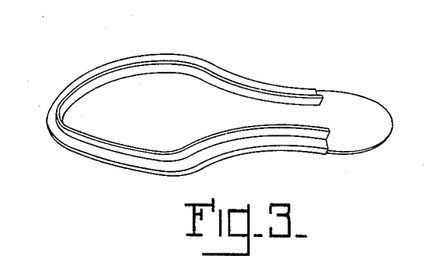
Fig. 3 shows the outer member after having been formed.
Figures 4, 5:
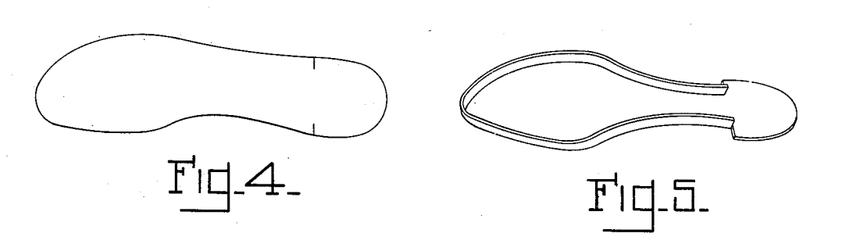
Fig. 4 shows a blank for the manufacture of the inner member.
Fig. 5 shows the said inner member after having been formed.

While the insole member is being formed by the machine, it is in the position which it occupies in the shoe, that is, with the lips down and flat side uppermost, this being the reverse position from that shown in Figs. 1, 3 and 5, in which for convenience of illustration the insole members are shown bottom side up.

The invention will be fully understood from the following description when taken in connection with the accompanying drawings and the novel features thereof will be pointed out and clearly defined in the claims at the close of this specification.

Referring now to the drawings, at 11 is shown a frame and at 12 a suitable work table. Above the table 12, is placed a heated bed 13 provided with heating mechanism, as, for instance, two electric heating cartridges 14, 14, (see Figs. 8 and 9) supplied with current by an electric circuit 10. The bed 13 is provided on its upper side with a wide slot within which is a narrow inclined surface 110 which coöperates with a similar surface on the under side of a wedge 21 which is movable in and out relatively to the bed 13 by means of a hand screw 111 provided with collars 112 engaging a lug 113 on the wedge 21. At 25, 25 are seen two patterned studs secured to the table 12 by cap screws 20, 20. The wedge 21 is slotted as shown at 24 to permit the studs 25 to pass up through without interfering with the lengthwise movement of the wedge. On top of the bed 13 and wedge 21 is placed a filler plate 3 on which rests a bottom plate 15 which in turn supports a split top plate formed in two parts 9 and 16 (see Fig. 5).

In the bottom plate 15 are two holes countersunk on both faces of the plate as shown at 8, and two pins 7 having heads fitting the countersinks are located in the holes and project down into holes in the suds 25, 25. This construction is such that the bottom plate 15 and parts supported thereon may be raised slightly by the hand screw 111 and wedge 21 to compensate for differences in thickness of the stock, also it permits the bottom plate 15 to be turned over when changing from rights to lefts. At 6, 6 are shown two small pins projecting up from the heads of the bolts 7 and entering holes 4 in the split plates 9 and 16 to keep them from separating. By the mechanism described the bed can be raised or lowered a little as required to provide for variations in thickness of the leather, since it is necessary that the top surface of the plate over which the member is being molded shall occupy the proper position relatively to the level of the toe plate and side plates by which the lips of the insole members are formed as will be hereinafter described. The bottom plate 15 is of the shape and size of the interior of the inner member of the insole to be made except at the heel where it is formed into an extension on which the heel gage 103 is mounted.

Figures 8, 15:
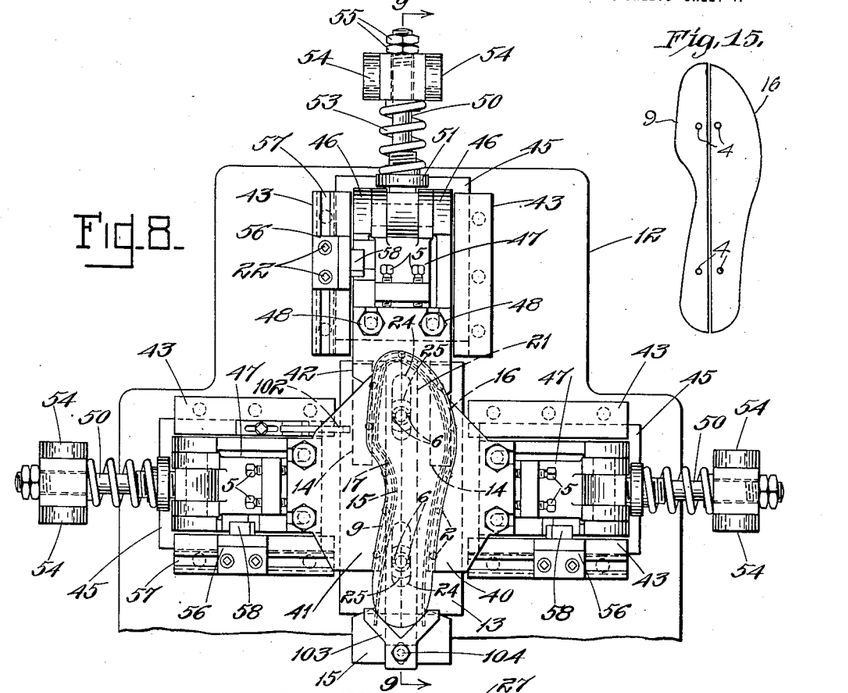
Fig. 8 is a top plan view of the table showing the toe and side plates, said parts having been moved in to compress the margins of the outer members of an insole, the plunger and associated parts being removed.
Fig. 15 is a detail of the split plates 9 and 16.
Figure 9:
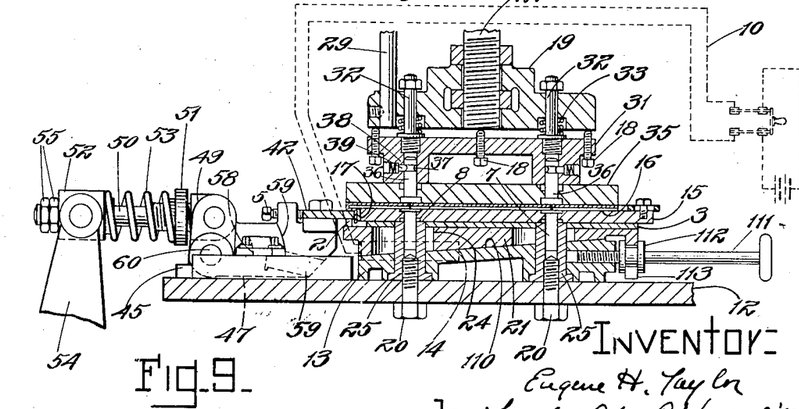
Fig 9 is a view partly in section taken on line 9, 9 of Fig. 8.
Figure 12:
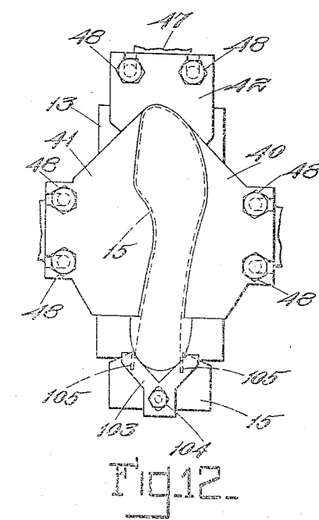
Fig 12 is a top plan view of the toe plate, side plates and associated parts, showing the inner blank of the inner sole in position, the machine being adjusted for the manufacture of the inner member shown in Figs. 4 and 5.

During the manufacture of the outer member the bottom plate 15 will be provided with a band 17 shown in dotted lines in Fig. 8 and in section in Fig. 9, which is of a thickness corresponding to the thickness of the leather of which the inner member is composed. The two rear ends of the band 17 enter slots 105, see Fig. 12, in the heel portion of the bottom plate 15. The split top plate is made of thin metal and projects beyond the bottom plate 15 a distance sufficient to permit the protruding edge of the outer member to be formed over it. During the manufacture of the outer member, the machine is used with the band 17 and split top plate in place, but during the manufacture of the inner member these parts are not employed, the molding then taking place directly against the top and edges of the bottom plate 15.

The plunger by which the blank of material is held against the plate 15 or split plates 9 and 16 as the case may be, is guided in an upright 26 forming part of the frame. At 27, is shown the plunger rod which slides in brackets 28 on the upright 26. At the lower end of the plunger rod 27 is a head 19, to which is secured a guide rod 29, passing through a bracket 30 secured to the upright 26. This prevents the head rotating on the plunger rod 27. Beneath the head 19, is supported a spring plate 31 carried on bolts 32 which are surrounded by springs 33 located in counterbores in the head 19. The springs permit the spring plate 31 to yield relatively to the head at the end of the down stroke of the plunger. At 18, 18 are shown screw stops passing upward through the spring plate 31 and engaging the under side of the head 19 to limit the range of movement of the spring plate 31 relatively to the head 19 and thus to regulate the pressure which the head applies to the blank. Secured to the under side of the spring plate 31, is the top presser member 35, preferably made of hard wood of substantially the outline of the top face of the finished insole member and is provided on its upper surface with two pins 36 having a half-round annular groove 37 in the side surface thereof. These pins 36 enter corresponding holes drilled in two bosses 38 secured to the under side of the spring plate 31. These bosses 38 are provided with snap pins 39 the heads of which engage the half-round grooves in the pins 36. It will be seen that this construction affords a convenient mechanism by which the wooden top presser member 35 may be quickly attached to or detached from the spring plate on the head of the plunger.

Figure 2:
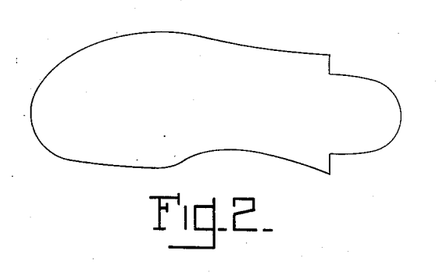
Fig. 2 shows the blank of leather from which the outer member of said insole is made.
Figure 10:
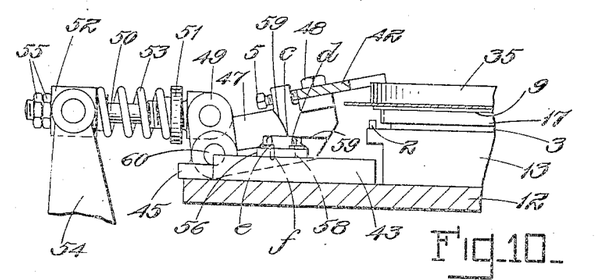
Fig. 10 is a detail of the operating mechanism for the toe and side plates.

As will be understood the blank of material shown in Fig. 2 is laid on the top of the split top plates 9 and 16, and the plunger comes down and compresses the blank firmly between the presser member 35 and the slit top plate. At this time, the edge of the blank protrudes beyond the edge of the split top plate as shown in Fig. 10. The folding down and molding of this protruding edge is performed by two side plates 40 and 41 and a toe plate 42. The operation of the toe plate 42 will be described in detail. It will be understood that the two side plates operate in the same manner.

At 43, 43 (see particularly Figs. 8, 10 and 11) are shown a pair of ways secured to the table 12. A slide 45 moves in these ways. On the slide 45, are lugs 46 to which is pivoted at 60 an elbow lever 47, one arm of which projects toward the form and carries thereon the toe plate 42. The toe plate 42 is secured adjustably to the arm 47 by means of the cap screws 48. This forms a convenient arrangement so that the toe plate can be removed and replaced by a toe plate of another shape when desired. At 5, 5 are shown two screws passing through an upward projection on the elbow lever 47 which rest against the edge of the toe plate 42 and serve as a means of accurate adjustment and take the thrust which would otherwise come on the cap screws 48. The other arm 49 of the elbow lever is connected with a link 50 which passes through a block 52 which is pivotally connected with the upper ends of two levers 54, 54. The link 50 is also provided with an adjustable collar 51 and a spring 53 is inserted between the collar 51 and the block 52. By varying the position of the collar 51 the required pressure may be obtained. The position of the link 50 relatively to the levers 54 is adjusted by means of the two nuts 55 on the end of the link 50. The construction just described affords a yielding pressure on the work and also makes it possible to move the slide 45 toward or away from the work, as is required in adjusting the machine to produce insoles of different sizes or to produce inner instead of outer members.

At 56 is shown a bracket secured to one of the ways 43 by means of T-headed bolts 22 slidable in a slot 57. On the side of the bracket 56 is secured a fixed cam block 58 which projects into an irregular cut out portion or slot 59 cut in the side of the elbow lever 47. The cam block 58 is in cross section substantially diamond shaped, as is shown clearly in Fig. 10, the front and back faces of said cam being curved to work against the corresponding adjacent faces of the sides of the slot 59 in the elbow lever 47. The slot and fixed cam member are of such shape as to permit the elbow lever 47 at a certain time in its movement to swing freely about the pivot 60 by which it is connected to the slide 45. Therefore, when the levers 54 exert pressure on the elbow lever 47 the cam 58 and cam slot 59 cause the elbow lever to have the following movement.

Figure 11:
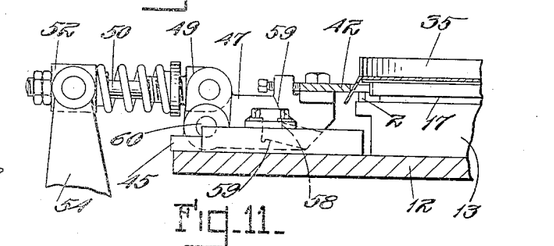
Fig. 11 is a similar detail showing the parts in another position.

First the toe plate is moved toward the form a short distance to bring its edge in proper position above the projecting edge of the blank; next the elbow lever is swung down being moved about the pivot 60 of the elbow lever until its top surface is horizontal and at a level below the projecting edge of the split top plate which is almost but not quite equal to the thickness of the leather; and finally the toe plate is moved in toward the form to exert heavy pressure on the leather. The second movement folds the projecting edge of the blank over the projecting edge of the split top plate, and the last movement carries the edge of the blank in under the edge of the top plate and up against the edge of the form thereby stretching the blank around the top plate and molding it in the position required so that when set by the heat and pressure, the blank will assume the proper form. The parts are so arranged that during the final or stretching movement of the side plates, the split plate 9, 16 is lifted up slightly so that when the final pressure is exerted by the presser head 31, in a manner to be described, the bulk of the pressure will be brought to bear against the edge plates 40, 41 and 42 at the edges of the blank. In order to support the inner edges of the edge plates, I provide vertical lugs 2 which are secured to the bed plate 13 and upon which the inner edges of the edge plates are adapted to rest when in compressed position. I regard this as important for by this construction the blanks are subjected to pressure practically entirely at the sides where the pressure is necessary, the central portion of the blanks being free from any undue pressure and consequently from any injury because of the same. The movement of the edge plates is produced by the coöperation of the cam block 58, and slot 59. The first movement continues until the point $c$ on the side of the slot (see Fig. 10) gets past the corner $d$ of the cam block and thus permits the elbow lever to swing about its pivot 60. The second movement continues until the point $e$ gets below the corner $f$ of the cam block 58, after which the elbow is free to slide toward the form by the continued pressure exerted by the levers 54. Fig. 11 shows the position of the parts at the beginning of the last movement. The position of the parts at the end of the last movement is shown in Fig. 9. After the toe plate 42 has reached the limit of its movement toward the form, the levers 54 may continue their movement but the position of the toe and side members is not affected thereby, the spring 53 being compressed. A yielding pressure on the work results. The movement of the parts in the other direction is substantially the same. The toe plate is first moved away from the form and is then swung up and then is drawn away from the form to the position shown in Fig. 10.

The mechanism by means of which the various groups of instrumentalities are operated will now be described. At 65 is shown a pulley having formed therein a clutch 64 operated by a clutch fork 67 on a rock shaft 68. At 69 is shown a starting lever which the operator moves to set the machine in motion. The rock shaft 68 also has secured to it an arm 70 connected by a link 71 and a universal joint 72 to a stop lever 73 which is pivoted at 74. Connected with this stop lever 73 is an arm 75 to which is secured a brake shoe 76 normally bearing against the rim of a wheel 77 on the main shaft 78 of the machine. It will therefore be seen that when the starting lever 69 is moved to start the machine, the link 71 is lifted up, swinging the stop lever and disengaging the brake shoe 76 from the wheel 77. On the other end of the stop lever 73 is located a roll 79 which bears against the rim of a stop wheel 80. This stop wheel 80 has two depressions or notches 81 formed in it, said notches being 180° from each other, and is mounted on a cam shaft 84 which is driven from the main shaft 78 by means of a pinion 85 and gear 86. The plunger is operated from the cam shaft 84 by means of a cam groove 87 formed in the face of the gear 86. A cam roll 89 carried on a forked connecting rod 90 which straddles the cam shaft 84, slides the connecting rod longitudinally. The connecting rod 90 is attached at its upper end by a link 91 to one end of a bell crank 92 pivoted at 93 to the upright portion 26 of the frame of the machine. The other arm of the bell crank is connected by means of links 94 to a collar 95 on the plunger of the machine.

Figure 7:
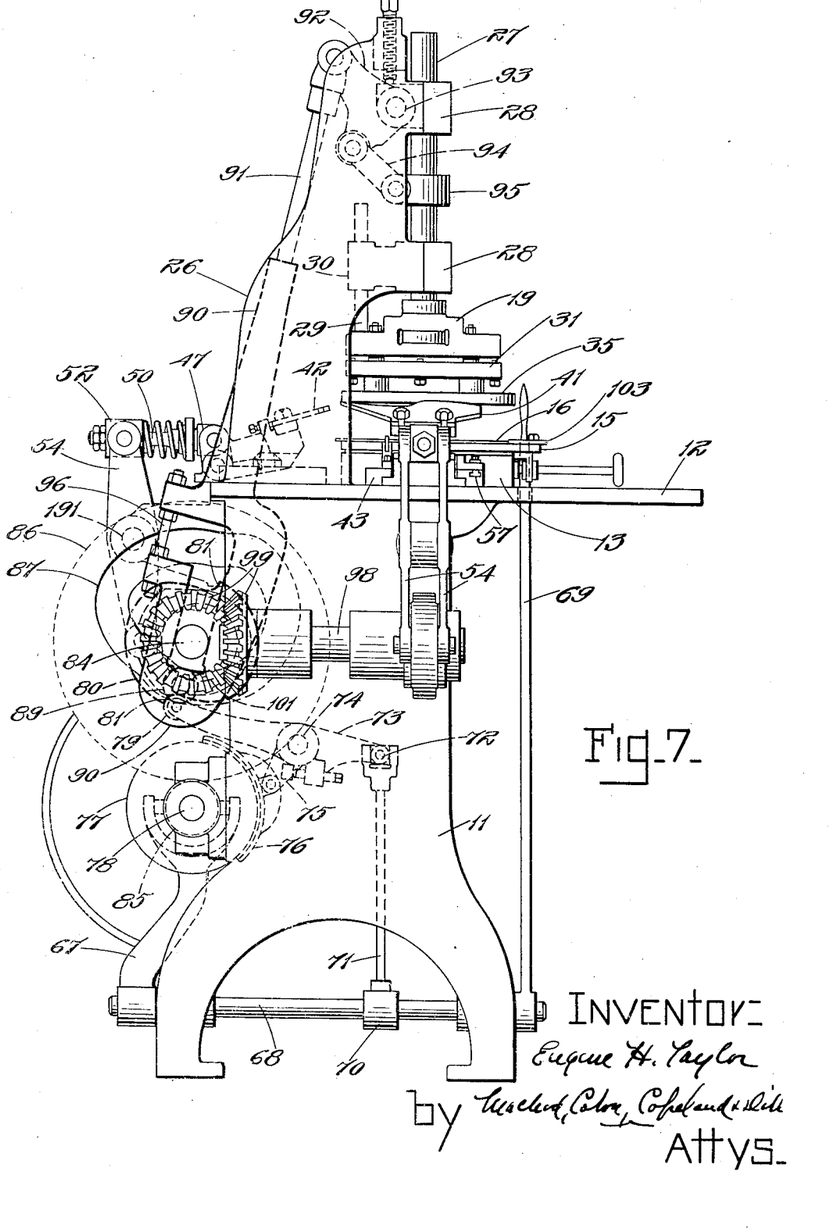
Fig. 7 is a side elevation thereof.

The gear 86 revolves in a clockwise direction when viewed as shown in Fig. 7. The cam groove 87 is so arranged that when the gear 86 is in the position shown in Fig. 7 the connecting rod 90 is raised which causes the head 19 and attached plate 35 to be lifted into their uppermost position. As the gear 86 revolves the cam roll 89 follows the cam groove 87 away from the cam shaft 84 and moves the connecting rod 90 and consequently the head 19 and plate 35 downwardly against the plate 15 with a light pressure, the springs 33 between the head 19 and plate 31 being compressed slightly. The light pressure thus produced is sufficient to hold the insole member in position but is insufficient to prevent the stretching action referred to above, so that when the side plates 40, 41 and toe plate 42 move inwardly, as hereinabove described, they stretch the insole member about the plate 16 and press it into position to form the projecting lip. A further rotation of the gear 86 brings the cam roll 89 to that portion of the cam groove 87 which is farthest away from the cam shaft 84. This operates to move the head 19 down still more and therefore to further compress the springs 33 until the screws 18 engage the head 19 and a positive pressure is exerted by the plate 35 on the insole member. This greater pressure takes place after the side plates 40, 41, and the toe plate 42 have completed their inward movement in order that the edges of the insole member may be pressed out between the edges of the plates 40, 41, 42 and the plate 35. Inasmuch as the blank and split plate 9, 16 have been raised slightly by the edge plates the greater part of the final pressure is brought to bear at the edges of the insole. By means of the wedge adjustment described above the pressure applied at the edges of the blank may be varied as desired and in fact may be adjusted for various thicknesses of material. In this manner the edges of the insole member are subjected to a final hot pressure which gives the insole member the necessary set to retain the shape required.

The forked connecting rod 90 is made in the shape shown in Fig. 7 so that the machine may be conveniently assembled, one side of the connecting rod being cut away as shown and the parts secured together and strengthened by the bolt 96.

Figure 6:
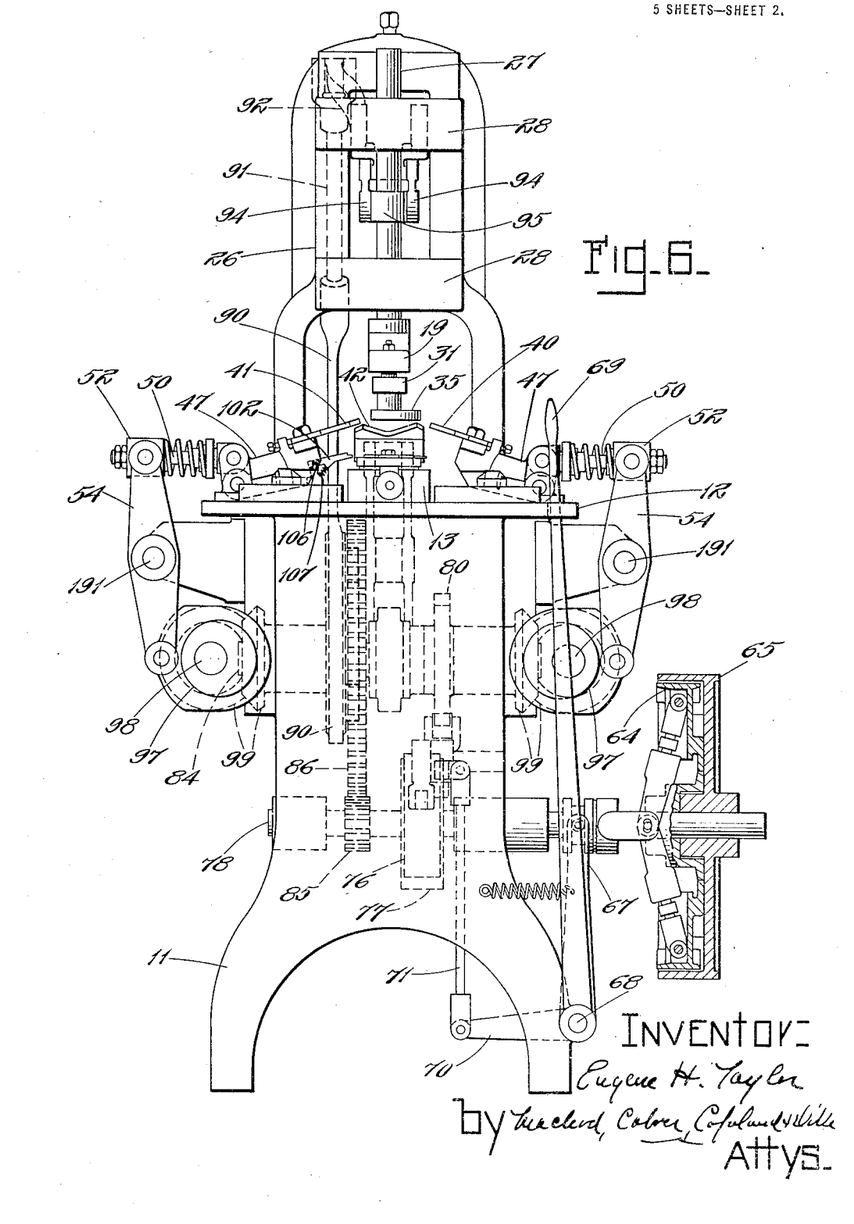
Fig. 6 is a front elevation of a machine embodying my invention.

The side plates 40 and 41 are operated by eccentrics 97, 97 to which they are connected by the levers 54 which are pivoted at 191 to brackets on the frame of the machine. The eccentrics 97, 97 are carried on cross shafts 98, 98 (see Fig. 6) which are driven from the cam shaft 84 by means of beveled gears 99, 99. The toe plate 42 is operated by an eccentric 101 to which it is connected by similar levers 54 which are pivoted at 191 to a bracket on the frame of the machine. The eccentric 101 is located on the cam shaft 84.

The position of the blank in the machine is determined by means of a heel gage 103 secured at 104 to the projecting end of the bottom plate 15, and on the side by a yielding gage 102 pivoted at 106 to two lugs on the side of one of the ways 43. The side gage 102 is notched at its end and is normally held in the position shown in Fig. 6 by means of the spring 107. It is so constructed that as the side plate descends it yields and is pressed down out of the way.

The operation of the machine is as follows: The operator first puts in place a blank like that shown in Fig. 2, with the edge of the heel portion resting against the heel gage 103 and the side edge of the toe portion resting against the side gage 102. The leather of which the blank is made is in a properly tempered condition, having been moistened somewhat in any suitable manner. The operator then moves the starting lever 69 and it causes the clutch 64 to engage, releases the brake 76 and at the same time moves the roll 79 out of the notch 81 in the stop wheel 80. This permits the main shaft to cause the cam shaft 84 and the two cross shafts 98 to rotate until the stop roll 79 drops into the next notch 81 in the stop wheel 80. When this occurs, the clutch is released and the brake is applied to the main shaft, stopping the machine. The movement of the parts up to this time has caused the plunger to descend and apply a light yielding pressure to the blank, which has been laid on the top of the top plate, and has caused the side plates and toe plate to bend down the projecting edge of the blank to the position shown in Fig. 11 and then fold it inwardly under the projecting edge of the split top plate to the position shown in Fig. 9. The movement has further caused the plunger 19 to descend to its lowermost position after the side plates and toe plate have moved inwardly so that a final heavy pressure is applied. The machine then stops in this position and remains there until the operator again moves the starting lever. It is necessary that the work shall remain under pressure for an appreciable length of time to permit the heat of the electrically heated bed plate to dry out the moisture contained in the tempered stock and to set it in the position given it by the plates. In the commercial use of the machine, I contemplate that one operator will be able to tend two or more machines. When the material operated on is of such nature that it requires some time to set, after putting a blank in position in one machine and subjecting it to pressure as described, the operator will allow the machine to remain in the position shown in Fig. 9 while he is removing the finished insole member from the other machine, inserting a new blank in this machine and bringing the parts of this machine to the position shown in Fig. 9. In this way one operator can tend two machines without any waste of time, and the work in each machine will be subjected to pressure for the necessary period. It will be obvious however, that some materials require only a short time to set in which case the blanks are formed rapidly one after another.

Figure 13:
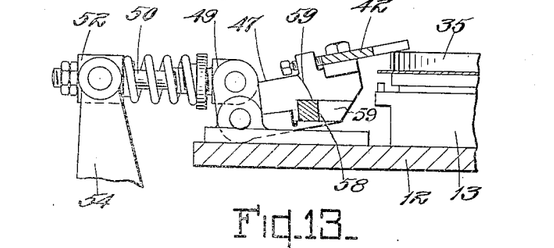
Fig 13 is a detail similar to Fig. 10, the parts being adjusted for the manufacture of the inner member.
Figure 14:
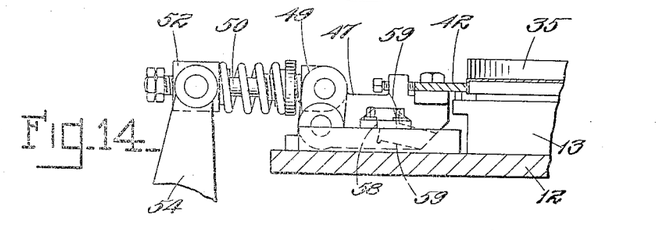
Fig. 14 is a detail similar to Fig. 11, the parts being adjusted for the manufacture of the inner member.

When the machine is to be used for the manufacture of the inner member of the insole shown in Figs. 4 and 5, the split top plate and the band 17 are removed so that the lower member then has the proper shape to serve as a mold about which to form the blank, such as is shown in Figs. 4 and 5. The side and toe pressers are then adjusted in the elbow lever 47 and the position of the bracket 56 which carries the fixed cam member 58 is changed slightly as shown in Figs. 13 and 14. The machine is then in condition to be operated as before.

The machine is also designed to assemble the outer and inner insole members together. When this is done the plate 16 is removed and the insole members are put together with suitable adhesive between them and placed in position on the plate 15.

The parts of the machine are placed in the position required for this operation. In practice the machine is preferably set up in gangs of three, each being arranged for a separate operation and in this way the outer and inner members are rapidly formed and assembled into an insole.

What I claim is:

1. In a machine of the character described adapted to make either the inner or outer member of an insole, the combination of top and bottom pressing members, one of which is the size and shape of the inside of the inner member, edge plates movable toward and away from the pressing members, a top plate superposed upon one of said pressing members and having a protruding edge, and a band surrounding the edge of said pressing member and of a thickness to make the said pressing member of the size of the inside of the outer member of the insole when the band is applied to the said pressing member.

2. In a machine of the character described, the edge plate mechanism which consists of a slide, an elbow lever pivoted on the slide and supporting the edge plate, said elbow lever being adjacent a fixed portion of the machine, one of said parts being provided with a slot which is open at one end, a cam member in said slot, said cam member being secured to the other of said two members, and means to exert a pressure on said elbow lever, so that it will be first caused to swing about its pivot by the cam member and slot, and will then slide bodily.

3. In a machine of the character described the combination of top and bottom pressing members one of which is movable toward the other, edge plates mounted to swing past the plane of the proximate faces of said presser members and then move inwardly toward them, and means for operating said movable presser member whereby it is moved toward said other presser member to exert a light pressure thereon and thereafter moved further toward said other presser member to exert an additional pressure thereon.

4. In a machine of the character described, the combination of top and bottom pressing members, one of which has a protruding edge, the stock being held between the proximate faces of said pressing members with its edge protruding beyond the said protruding edge of the said pressing member, edge plates mounted to move past the plane of the proximate faces of said pressing members to fold the stock over the said protruding edge of the pressing member and then move inwardly to subject the edge to pressure, and mechanism for moving one of said presser members toward the other, said mechanism operating to cause said movable presser member to exert a light pressure against said other presser member while said edge plates are moving inwardly to subject the edge of said presser members to pressure and further operating to cause said movable presser member to exert additional pressure against said other presser member after said edge plates have completed their inward movement.

5. In a machine of the character described the improved presser member comprising a head, a plate yieldingly secured thereto, a member on said plate provided with a hole therein, a presser surface having a pin which is provided with an annular groove said pin being adapted to be received within the hole in said member and a spring latch which is adapted to engage said groove to hold said presser surface in position.

6. In a machine of the character described, the combination of a top presser member, and a bottom presser member one of which members has a protruding edge movably mounted thereon, of edge plates adapted to fold a blank around said protruding edge and to move said blank and protruding edge slightly away from said presser member, and means for moving one of said presser members toward the other to bring pressure to bear on the edges of said blank.

7. In a machine of the character described, the combination of a top presser member and a bottom presser member, one of which is provided with a protruding edge, edge plates adapted to move past the plane of said protruding edge and to move inwardly beneath the same and supports beneath said edge plates upon which said edge plates rest when beneath said protruding edge.

8. In a machine of the character described, the combination of a top and bottom presser member one of which is provided with a protruding edge, of edge plates which coöperate with said members to fold a blank about said protruding edge and to lift said blank and edge plate slightly away from said presser member, means for moving one of said presser members toward the other to bring pressure to bear on the edges of said blank and mechanism for adjusting the amount of movement given to said protruding edge in said blank.

9. In a machine of the character described, the combination with coöperating presser members one of which is provided with a movable protruding edge, of edge plates adapted to move past the plane of said protruding edge, and thereafter inwardly against the blank at one side of said protruding edge and thereby to move said blank and protruding edge away from said presser member, means for adjusting said protruding edge relatively to said edge plates, and mechanism for moving one of said presser members toward the other to bring pressure to bear against the edges of said blank.

10. In a machine of the character described, the combination with a presser member, and edge plates movably mounted with relation thereto, of a bed plate adapted to coöperate with said presser member and edge plates consisting of a bottom plate and a wedge located beneath the said bottom plate and extending substantially from side to side thereof whereby the said bottom plate may be adjusted relatively to the other members and is supported thereby.

In testimony whereof I affix my signature, in presence of two witnesses.

EUGENE H. TAYLOR.

Witnesses:
CAMERON MACLEOD,
ALICE H. MORRISON.